United States Patent [19]

Ono et al.

[11] Patent Number: 4,710,421

[45] Date of Patent: Dec. 1, 1987

[54] MAGNETIC RECORDING MEDIUM

[75] Inventors: Toshio Ono; Yasuo Tamai; Chiaki Mizuno; Hiroshi Ogawa; Shinji Saito, all of Odawara, Japan

[73] Assignee: Fuji Photo Film Co., Ltd., Kanagawa, Japan

[21] Appl. No.: 29,557

[22] Filed: Mar. 24, 1987

[30] Foreign Application Priority Data

Mar. 24, 1986 [JP] Japan .................................. 61-65315

[51] Int. Cl.⁴ ............................................. G11B 5/70
[52] U.S. Cl. .................................. 428/213; 427/128; 428/216; 428/480; 428/694; 428/900
[58] Field of Search .............. 428/213, 216, 480, 694, 428/900; 427/128

[56] References Cited

U.S. PATENT DOCUMENTS

| | | | |
|---|---|---|---|
| 4,187,341 | 2/1980 | Suzuki et al. | 428/900 |
| 4,275,107 | 6/1981 | Bartkus et al. | 428/220 |
| 4,316,927 | 2/1982 | Kimura et al. | 428/216 |
| 4,481,231 | 11/1984 | Hashimoto et al. | 427/128 |
| 4,546,030 | 10/1985 | Minami et al. | 428/480 |

*Primary Examiner*—Paul J. Thibodeau
*Attorney, Agent, or Firm*—Sughrue, Mion, Zinn, Macpeak & Seas

[57] ABSTRACT

A magnetic recording medium having a heat shrinkage ratio of not higher than 1% and comprising a nonmagnetic support in the form of a tape which has a heat shrinkage ratio of not higher than 1.8%, a Young's modulus of 450 to 650 kg/mm² in the longitudinal direction and a Young's modulus of 450 to 550 kg/mm² in the width direction, and a magnetic recording layer provided on the support which comprises a binder and a ferromagnetic powder dispersed therein and has a squareness ratio of not less than 0.89. All the heat shrinkage ratios are values determined after being allowed to stand at 110° C. for 4 hours.

7 Claims, No Drawings

MAGNETIC RECORDING MEDIUM

BACKGROUND OF THE INVENTION

1. Field of the Invention

The present invention relates to a magnetic recording medium. More particularly, the invention relates to a magnetic recording medium such as an audio cassette tape or a video cassette tape which is improved in heat resistance.

2. Description of Prior Art

As a magnetic recording medium (also referred to hereinafter as a magnetic tape) such as an audio tape or a video tape, a recording tape comprising a nonmagnetic support and a magnetic recording layer provided on the support which contains a ferromagnetic powder dispersed in a resin component (binder) is generally employed. Recently, the audio tape or video tape has been widely employed in the form of a cassette encasing the tape therein.

Previously, the audio tape or video tape encased in a cassette has been used or stored under mild ambient conditions with little temperature change such as in a room of a residence. However, as a stereophonic system in an automobile (i.e., car stereo) is developed, the audio tape is now frequently used or stored in an automobile. It is reported that the temperature inside of an automobile sometimes elevates to a very high level, for instance, up to 104° C. when the automobile is allowed to stand for a certain period of time under exposure of sunlight in a summer season according to high-temperature or low-temperature exposure test of automobile components (JIS-D-0204). Further, when an audio tape installed in a cassette-type appliance with radio is used outdoors, the tape is sometimes exposed to a relatively high temperature. A video tape is also sometimes exposed to a high temperature when the tape is used outdoors with a handy video tape recorder or a video camera.

Most of the conventional magnetic recording tapes shrink in the longitudinal direction to show overall curling and/or shrink in the width direction to show partial curling when kept for a long period at a high temperature. Further, the conventional magnetic recording tape wound around a hub sometimes pushes the hub out when left to stand at high temperatures, because the wound tape shrinks to tighten the hub greatly. The magnetic recording tape suffering from such deformation shows extreme variation of output in the reproduction mode, and hence no normal reproduction can be done. Further, such deformed tape cannot run smoothly. The deformation of the magnetic recording tape is more frequently observed with respect to relatively long magnetic recording tapes for playing a long period of time such as audio cassette tapes of C-80, C-90 and C-120 types and video cassette tapes for long time play. In such long recording tape, the tape is wound over a hub in extremely many folds so as to deform or push the hub out more frequently.

Accordingly, a magnetic recording medium is desired to be reduced in its heat shrinkage ratio, and heretofore, a nonmagnetic support having a low heat shrinkage ratio has been used in a magnetic recording medium for the purpose.

For instance, Japanese Patent Provisional Publication No. 59(1984)-11531 discloses a magnetic recording medium having a heat shrinkage ratio of not lower than 1% in the direction along which the highest heat shrinkage is given when the medium is allowed to stand at 100° C. The publication describes that in the case of using a stretched polyethylene terephthalate film which is widely used as a flexible support (nonmagnetic support), the film is advantageous; further subjected to heat treatment to reduce the heat shrinkage ratio. That is, such heat treatment can reduce the heat shrinkage ratio of the resulting support to not higher than 1%, while the polyethylene terephthalate film prepared by a conventional process generally has a heat shrinkage ratio of approx. 2.3%.

However, when the polyethylene terephthalate film is reduced in the heat shrinkage ratio by applying the above mentioned heat treatment, etc., its Young's modulus generally decreases simultaneously with the reduction of the heat shrinkage ratio. A magnetic recording medium having a flexible support of such low Young's modulus is liable to be deformed in the normal running procedure because of unsatisfactory mechanical or physical strength.

Accordingly, there are restrictions in the preparation of a magnetic recording medium having both of a satisfactory running property and a low heat shrinkage ratio by the conventional methods from the viewpoint of enhancing the mechanical strength of the resulting recording medium.

SUMMARY OF THE INVENTION

It is an object of the present invention to provide a magnetic recording medium which is hardly deformed in the repeated running under the normal conditions and even in the case that the medium is exposed to high temperatures.

It is another object of the invention to provide a magnetic recording medium which is improved in the running property and electromagnetic conversion characteristics as well as in heat resistance.

There is provided by the present invention a magnetic recording medium having a heat shrinkage ratio of not higher than 1% and comprising a nonmagnetic support in the form of a tape which has a heat shrinkage ratio of not higher than 1.8%, a Young's modulus of 450 to 650 kg/mm$^2$ in the longitudinal direction and a Young's modulus of 450 to 550 kg/mm$^2$ in the width direction, and a magnetic recording layer provided on the support which comprises a binder and a ferromagnetic powder dispersed therein and has a squareness ratio of not less than 0.89. All the heat shrinkage ratios are values determined after being allowed to stand at 110° C. for 4 hours.

The heat shrinkage ratio used herein means a heat shrinkage ratio which is measured in the direction along which the highest heat shrinkage is given. A magnetic tape and a nonmagnetic support generally have the highest heat shrinkage ratio in the longitudinal direction.

The magnetic recording medium of the present invention is hardly deformed heat shrinkage even when the medium is left to stand for a long period of time in an atmosphere of high temperature, because the heat shrinkage ratio of the recording medium is very low level.

In more detail, while the conventional magnetic recording medium is reduced in the heat shrinkage ratio by using a support of low heat shrinkage ratio, the magnetic recording medium of the invention is reduced in the heat shrinkage ratio by providing on a support a magnetic recording layer which has a high squareness ration and is capable of reducing the heat shrinkage ratio of the recording medium per se. Hence, in the invention, it is unnecessary to use a special support of an extremely low heat shrinkage ratio, and the support used in the invention can be selected from those conventionally employed and having a relatively low heat shrinkage ratio, whereby giving a magnetic recording medium further reduced in the heat shrinkage ratio, as compared with the conventional one.

Since the magnetic recording medium of the invention is almost free from lowering of mechanical strength of the support caused by the reduction of the heat shrinkage ratio of the support (namely, decrease of Young's modulus of the support), deterioration of the strength accompanied by the reduction of the heat shrinkage ratio which occurs in the conventional medium is not produced in the present invention. As a result, the magnetic recording medium of the invention shows high running endurance in the normal running procedure as well as a low heat shrinkage ratio.

Further, the magnetic recording medium of the invention not only retains excellent properties of the known support material such as a polyethylene terephthalate film but also has the above-mentioned low heat shrinkage property. For these reasons, the magnetic recording medium of the invention has a great value in the practical use.

Especially in the case of an audio cassette tape (audio tape encased in a cassette in the wound form around a hub), a phenomenon of pushing out the hub hardly takes place because of the low heat shrinkage ratio of the tape, even when the tape is left to stand at a high temperature of approx. 100° C. or higher in the wound form over the hub. Hence, the magnetic tape is almost free from stoppage of tape-running in the running procedure and shows high running property.

In addition, the recording medium of the invention naturally has high electromagnetic conversion characteristics owing to high squareness ration of the magnetic recording layer.

DETAILED DESCRIPTION OF THE INVENTION

A magnetic recording medium of the present invention basically comprises a nonmagnetic support and a magnetic recording layer provided on the support.

The nonmagnetic support of the recording medium of the invention shows a heat shrinkage ratio of not higher than 1.8%, preferably not higher than 1.5%, more preferably not higher than 1.3%, after the support is allowed to stand at 110° C. for 4 hours.

The magnetic recording medium of the invention is in a continuous form such as a tape, and the nonmagnetic support is also in a continuous form. Accordingly, the heat shrinkage ratio in the recording medium of the invention means a heat shrinkage ratio which is measured in the direction along which the highest heat shrinkage is given, that is, in the longitudinal direction.

If the heat shrinkage ratio of the support is higher than 1.8%, the heat shrinkage ratio of the resulting whole medium cannot be reduced effectively, and thereby the resulting medium hardly shows satisfactory running property after the medium is left at a high temperature. The nonmagnetic support having the above-defined heat shrinkage ratio can be produced by a conventional method such as a method of appropriately adjusting the conditions for stretching a support material (film) or a method of heating the stretched material.

When the heat shrinkage ratio of the film is reduced according to the conventional methods, the Young's modulus of the film generally decreases. If such film is employed as a support, the resulting magnetic recording medium is reduced in the heat shrinkage ratio, while the strength thereof is lowered. As a result, the magnetic recording medium is liable to be deformed in the repeated running under normal conditions.

Accordingly, the nonmagnetic support of the recording medium of the invention is required to have a Young's modulus in the range of 450 to 650 kg/mm$^2$ in the logitudinal direction (MD) and a Young's modulus in the range of 450 to 550 kg/mm$^2$ in the width direction (TD) in addition to the heat shrinkage ratio in the above-defined range. Further, the difference between these Young's moduli is preferably not larger than 250 kg/mm$^2$.

In the case of a magnetic tape having a squareness ratio of the magnetic layer and a heat shrinkage ratio of the support both in the ranges defined in the invention but having Young's moduli of the support lower than the above-defined lowest limit, deformation of the tape caused by heat shrinkage hardly occurs, but uneven winding of the tape around a hub is brought about in the course of the running for a long period under the normal conditions, resulting in stoppage of tape-running.

The nonmagnetic support employable in the invention can be prepared, for instance, by subjecting a polyester film to biaxial stretching (biaxial orientation) under controlling the stretching conditions and then heat treating the stretched film at a temperature of not lower than 110° C.

Examples of preferred materials of the nonmagnetic support include polyester films, polycarbonate films, polyamide films, polysulfone films, polypropylene films, and polyethersulfone films. Particularly preferred are polyester films such as a polyethylene terephthalate film, because they have excellent properties as a nonmagnetic support and are obtainable at a relatively low cost.

The nonmagnetic support employed in the invention generally has a surface of a center line average height (Ra) in the range of 0.01 to 0.1 μm on the side where a magnetic recording layer is to be coated.

Employment of the nonmagnetic support having the above-mentioned surface roughness assures high running property of the resulting tape, because the surface of the magnetic recording layer does not have excessive smoothness and thereby the friction coefficient of the surface thereof is not too high. Further, since the surface of the magnetic recording layer is not made excessively rough, deterioration of the electromagnetic conversion characteristics caused by a spacing loss between the surface of the recording layer and a magnetic head is reduced.

The thickness of the nonmagnetic support generally ranges from 5 to 30 μm, preferably from 5 to 20 μm.

The surface of the support not facing a magnetic recording layer can be provided with a backing layer, if desired. It is also possible to provide an adhesive layer between the the support and a magnetic recording layer or the backing layer.

On the support, a magnetic recording layer comprising a ferromagnetic powder dispersed in a binder is provided.

As the binder employable in the magnetic recording medium of the invention, there can be mentioned those conventionally employed for the formation of a magnetic recording layer. Examples of the binder include vinyl chloride/vinyl acetate copolymers with vinyl alcohol, maleic acid or acrylic acid, vinyl chloride/vinylidene chloride copolymer, vinyl chloride/acrylonitrile copolymer, ethylene/vinyl acetate copolymer, cellulose derivatives such as nitrocellulose, acrylic resin, polyvinyl acetal resin, polyvinyl butyral resin, and polyurethane resin. Preferably employed is a combination of a vinyl chloride/vinyl acetate copolymer having other repeating unit such as maleic acid or vinyl alcohol and a polyurethane resin. Further, a polyisocyanate compound can be employed as a curing agent in combination with the above-mentioned copolymers or resins.

The binder is generally employed in an amount of 10 to 100 parts by weight based on 100 parts by weight of the ferromagnetic powder.

The ferromagnetic powder can be selected from those conventionally employed. Examples of the ferromagnetic powder include an iron oxide-type ferromagnetic powder such as $\gamma$-$Fe_2O_3$, a modified iron oxide-type ferromagnetic powder such as a Co-containing iron oxide ferromagnetic powder, and a ferromagnetic metal powder mainly containing cobalt, nickel or iron.

There is no specific limitation on the shape of the ferromagnetic powder, provided that the shape is generally used. However, the ferromagnetic powder in a needle shape is generally subjected to a magnetic orientation to orient the ferromagnetic particles in parallel with the longitudinal direction, so that the ferromagnetic powder in a needle shape is advantageously employed from the viewpoint of effective reduction of the heat shrinkage ratio of the resulting magnetic recording medium.

The magnetic recording layer provided on the nonmagnetic support has a squareness ratio of not less than the aforementioned specific value.

The squareness ratio of the magnetic recording layer has been conventionally improved only for the purpose of enhancing the electromagnetic conversion characteristics.

However, it has been confirmed by the study of the present inventors that when a magnetic recording layer having a squareness ratio of not less than the specific value is provided on the support, the magnetic recording layer serves as not only a layer for recording signals but also a layer for effectively reducing heat shrinkage property of the nonmagnetic support.

The squareness ratio (that is, maximum residual flux density/maximum flux density) of the magnetic recording layer can be generally increased by enhancing the orientation property of the ferromagnetic particles in the magnetic recording layer.

In general, the heat shrinkage ratio of the ferromagnetic powder per se is prominently lower than that of the nonmagnetic support. The squareness ratio of the magnetic recording layer is increased by orienting the ferromagnetic particles in order in the recording layer, whereby the heat shrinkage ratio of the recording layer is close to that of the ferromagnetic powder. As a result, the magnetic recording layer reinforces the nonmagnetic support and serves as a layer for reducing the heat shrinkage ratio of the nonmagnetic support.

The magnetic recording medium of the invention comprises a magnetic recording layer having a squareness ratio of not less than 0.89 which is provided on the aforementioned nonmagnetic support. The squareness ratio of the magnetic recording layer is preferably not less than 0.90, more preferably not less than 0.91.

The heat shrinkage ratio of the magnetic recording medium having the above-described nonmagnetic support and magnetic recording layer according to the invention is not higher than 1% after allowing the medium to stand at a temperature of 110° C. for 4 hours. Even when a polyethylene terephthalate film is used as the nonmagnetic support, a magnetic recording medium having a heat shrinkage ratio of not higher than 0.5% after allowing the medium to stand at temperature of 110° C. for 4 hours is obtained.

Further, by setting the squareness ratio of the recording layer to not less than 0.94, the heat shrinkage ratio of the resulting medium can be made below a certain level even if the heat shrinkage ratio of the nonmagnetic support is relatively high. For instance, if a support having heat shrinkage ratio of 1.3% is used, the resulting magnetic recording medium has a low heat shrinkage ratio of not higher than 0.4%.

The thickness of the magnetic recording layer generally ranges from 0.5 to 10 $\mu$m. The ratio in the thickness between the nonmagnetic support and the magnetic recording layer is preferably in the range of 10:5 to 10:9.

When the thickness of the magnetic recording layer is excessively small as compared with that of the nonmagnetic support, the heat shrinkage ratio of the support almost defines the heat shrinkage ratio of the medium, and thereby the heat shrinkage ratio of the magnetic recording medium hardly reduces. When the thickness of the magnetic recording layer is excessively large as compared with that of the nonmagnetic support, the resulting medium is sometimes decreased in the mechanical strength.

The squareness ratio of the magnetic recording layer cannot be increased to the above-described level only by carrying out the conventional magnetic orientation which is generally applied in the preparation of a magnetic recording medium, and it is necessary to utilize a specific method described below in the preparation of a magnetic recording medium of the invention.

For increasing the squareness ratio of the magnetic recording layer, for example, a magnetic paint for the formation of a magnetic recording layer is additionally stirred by means of a high-performance dispersing apparatus such as a disperser or a high-speed homomixer just before the coating procedure of the magnetic paint, so as to enhance dispersion of the ferromagnetic powder.

Otherwise, a coated layer of the magnetic paint is subjected to a magnetic orientation while the coated layer is wet, and then the coated layer is dried in a drying apparatus installed with a magnetic orientation device comprising solenoid or cobalt magnet under treating with an electromagnet. Thus, the squareness ratio of the magnetic recording layer is increased. For carrying out such magnetic orientation, a magnetic orientation device as described in Japanese Patent Provisional Publication No. 54(1979)-149606 can be employed.

Alternatively, as described in Japanese Patent Provisional Publication No. 51(1976)-77303 and Japanese Patent Publications No. 56(1981)-856 and No. 57(1982)-13051, the coated layer of the magnetic paint is subjected to magnetic orientation under such conditions that the surface of the coated layer is brought into contact with a flexible sheet (this method is also referred to as simply "smoothing blanket treatment"), to enhance the squareness ratio of the magnetic recording layer.

The above-described methods are appropriately used in combination with each other to make the squareness ratio of the magnetic recording layer not less than 0.89.

The magnetic recording layer of the recording medium of the invention generally contains other additives such as abrasives (e.g., $Cr_2O_3$, SiC and $\alpha$-$Al_2O_3$), conductive carbon black, and lubricants (e.g., fatty acids, fatty acid esters and silicone compounds).

The process for the preparation of the magnetic recording medium of the present invention is described below.

First, the above-described components for the formation of a magnetic recording layer are added to an appropriate solvent, and they are mixed (stirred) in a conventional manner to prepare a magnetic paint (in the form of a dispersion). The magnetic paint is coated over the aforementioned support by a conventional method. The dispersing (stirring) procedure is preferably continued to just before the coating procedure is begun.

Second, the coated layer of the magnetic paint is subjected to a magnetic orientation while the coated layer is wet. The magnetic orientation is preferably done at the same time when the aforementioned smoothing blanket treatment is performed.

The coated layer having been subjected to the magnetic orientation is preferably allowed to dryness under applying to the layer an electromagnet as described before.

Subsequently, the dried layer of the magnetic paint is subjected to a smoothing process such as a supercalendering to give a magnetic recording layer. The nonmagnetic support having the magnetic recording layer thereon is cut into a desired shape. Thus, a magnetic recording medium of the present invention is prepared.

The magnetic recording medium prepared as above is advantageously employed as an audio cassette tape or a video cassette tape, because the medium has a low heat shrinkage ratio.

The examples and the comparison examples of the present invention are given below. In the following examples, the term "part(s)" means "part(s) by weight", unless otherwise specified.

The measurements of various values, properties and characteristics were done in accordance with the following procedures.

HEAT SHRINKAGE RATIO

A sample is allowed to stand at 23° C. and 50% RH, and then marks at intervals of approx. 10 cm ware placed on the sample. The each interval (A) is measured precisely by means of a micrometer. Subsequently, the marked sample was kept at 110° C. for 4 hours under such conditions that a tension of 0.4 g/10 mm (width) is applied to the sample. After this treatment is complete, the sample is again placed under the initial conditions for 1 hour, and the interval of the marks (A') is measured. The heat shrinkage ratio is calculated through the following equation.

$$\text{Heat Shrinkage Ratio} = \frac{A - A'}{A} \times 100(\%)$$

SQUARENESS RATIO

Squareness ratio (Br/Bm) is measured in the external magnetic field (Hm) of 5 kOe by means of a vibrating sample magnet meter (produced by Toei Industrial Co., Ltd.).

VARIATION OF OUTPUT LEVEL (I)

A sample tape is recorded with a signal of 3 KHz and −10 dB. This sample tape is then wound over a hub and kept at 110° C. for 4 hours. The tape is taken out and placed under ambient conditions for one hour. The signal is then reproduced for determining variation of the output level. 20 tapes are tested for one example. The results are shown by a ratio (%) of tapes which show variation of output level of not less than 6 dB.

VARIATION OF OUTPUT LEVEL (II)

A sample tape is recorded with a signal of 10 KHz and −10 dB. This sample tape is then wound over a hub and kept at 110° C. for 4 hours. The tape is taken out and placed under ambient conditions for one hour. The signal is then reproduced for determining variation of the output level. 20 tapes are tested for one example. The results are shown by a ratio (%) of tapes which show variation of output level of not less than 6 dB.

FREQUENCY SHIFT

A sample tape is recorded with a signal of 3 KHz and −10 dB. This sample tape is then wound over a hub and kept at 110° C. for 4 hours. The tape is taken out and placed under ambient conditions for one hour. The signal is then reproduced to measure the frequency of the reproduced signal, and a shifting ratio (%) of the frequency to the recorded signal of 3 KHz is determined.

RATIO OF STOP OF TAPE-RUNNING 20 sample cassette tapes (for one example) are allowed to stand at 110° C. for 4 hours. These sample tapes are repeatedly run in 20 commercially available cassette players (for installation in automobile) for 24 hours. The ratio of occurrence of tape-running stop is then determined.

SHRINKAGE OF INNER DIAMETER OF HUB

An inner diameter of a hub is measured under conditions that a sample tape is wound over the hub. The hub with the sample tape therearound is allowed to stand at 110° C. for 4 hours, and then is kept under ambient conditions for 1 hour. The inner diameter is again measured to determine the shrinkage ratio (%).

RATIO OF OCCURRENCE OF HUB PUSH-OUT

A hub wound thereon with a sample tape is allowed to stand at 110° C. for 4 hours. Then, the occurrence of push-out of the hub is checked through eye observation. 20 sample tapes are observed for one example.

EXAMPLE 1

The components indicated below were kneaded in a ball mill for 48 hrs. to give a dispersion.

$\gamma$-$Fe_2O_3$ (Hc: 400 Oe, needle ratio: 10/1, mean particle length: 0.4 $\mu$m): 100 parts Vinyl chloride/vinyl acetate/vinyl alcohol copolymer (copolymerization ratio=90:3:7, available from Sekisui Chemical Industries Co., Ltd.): 15 parts Polyurethane resin (Klisvon 6119, available from Daiinippon Ink Chemicals Co., Ltd.): 3 parts Oleic acid: 1 part Dimethylpolysiloxane (polymerization degree: 60): 0.1 part α-Olefin oxide (number of carbon atoms: 18): 1 part Carbon black: 0.5 part Butyl acetate: 250 parts.

The resulting dispersion was filtered over a filter having mean pore size of 3 μm to give a magnetic paint.

The magnetic paint was coated on a surface of a polyethylene terephthalate (PET) film having thickness of 7 μm (PET film had been subjected to biaxial orientation and then slight stretching in the longitudinal direction; heat shrinkage ratio: 1.3%, Young's modules in MD direction: 620 kg/mm$^2$, Young's modules in TD direction: 450 kg/mm$^2$) using a reverse roll, to give a layer having thickness of 5 μm (dry layer basis). The magnetic paint was subjected to high-speed stirring for 60 min. by means of a homomixer just before the coating procedure was begun.

The coated layer was subjected to a magnetic orientation with a smoothing blanket treatment in a magnetic orientation device while the coated layer was still wet under such conditions that the surface of the coated layer was brought into contact with a polyethylene terephthalate film having thickness of 25 μm and length of 18 cm.

Then, the coated layer was further treated with an electromagnet of 1,000 gauss and simultaneously dried in a drying apparatus installed in a magnetic orientation device comprising solenoid.

After the coated layer was dried, the layer was subjected to supercalendering at temperature of 70° C. and linear pressure of 300 kg/cm. Thus treated film was then slit to give a tape of 3.81 mm width, and the slit tape was cut to give a tape of 135 m length. The tape was encased in a cassette to give an audio cassette tape (Philips type compact cassette tape).

The resulting audio cassette tape was subjected to measurements of various properties and characteristics. The results are set forth in Table 1.

EXAMPLE 2

The procedure of Example 1 was repeated except that the magnetic orientation with smoothing blanket treatment was replaced with a conventional magnetic orientation and the flux density of the magnetic orientation device comprising solenoid installed in the drying apparatus was varied to 2,000 gauss, to prepare an audio cassette tape.

The resulting audio cassette tape was subjected to measurements of various properties and characteristics. The results are set forth in Table 1.

EXAMPLE 3

The procedure of Example 2 was repeated except that the flux density of the magnetic orientation device comprising solenoid installed in the drying apparatus was varied to 1,000 gauss, to prepare an audio cassette tape.

The resulting audio cassette tape was subjected to measurements of various properties and characteristics. The results are set forth in Table 1.

COMPARISON EXAMPLE 1

The procedure of Example 1 was repeated except that the high-speed stirring for 60 min. using a homomixer, the magnetic orientation with smoothing blanket treatment and the drying procedure by means of the drying apparatus installed with the magnetic orientation device were omitted, and the conventional magnetic orientation and drying were carried out, to prepare an audio cassette tape.

The resulting audio cassette tape was subjected to measurements of various proporties and characteristics. The results are set forth in Table 1.

COMPARISON EXAMPLE 2

The procedure of Example 2 was repeated except for using a PET film having heat shrinkage ratio of 0.7%, Young's modulus of 430 kg/mm$^2$ in MD direction and Young's modulus of 430 kg/mm$^2$ in TD direction as a nonmagnetic support, to prepare an audio cassette tape.

The resulting audio cassette tape was subjected to measurements of various properties and characteristics. The results are set forth in Table 1.

TABLE 1

| | Example | | | Com. Example | |
|---|---|---|---|---|---|
| | 1 | 2 | 3 | 1 | 2 |
| Support | | | | | |
| Heat shrinkage ratio (%) | 1.3 | 1.3 | 1.3 | 1.3 | 0.7 |
| MD (kg/mm$^2$) | 620 | 620 | 620 | 620 | 430 |
| TD (kg/mm$^2$) | 450 | 450 | 450 | 450 | 430 |
| Magnetic recording layer Squareness ratio | 0.94 | 0.91 | 0.90 | 0.87 | 0.91 |
| Audio Tape | | | | | |
| Heat shrinkage ratio (%) | 0.4 | 0.5 | 0.5 | 0.67 | 0.3 |
| Shrinkage ratio of hub (%) | 0.6 | 0.8 | 1.1 | 1.8 | 0.4 |
| Ratio of hub push-out (%) | 0 | 0 | 0 | 0 | 0 |
| Ratio of stop of tape running (%) | 0 | 0 | 0 | 0 | 25 |
| Variation of output level (I) | 0 | 0 | 0 | 0 | 0 |
| Variation of output level (II) | 0 | 0 | 5 | 15 | 0 |
| Frequency shift | 0.02 | 0.03 | 0.04 | 0.10 | 0.02 |

We claim:

1. A magnetic recording medium having a heat shrinkage ratio of not higher than 1% and comprising a nonmagnetic support in the form of a tape which has a heat shrinkage ratio of not higher than 1.8%, a Young's modulus of 450 to 650 kg/mm$^2$ in the longitudinal direction and a Young's modulus of 450 to 550 kg/mm$^2$ in the width direction, and a magnetic recording layer provided on the support which comprises a binder and a ferromagnetic powder dispersed therein and has a squareness ratio of not less than 0.89, all the heat shrinkage ratios being determined after being allowed to stand at 110° C. for 4 hours.

2. The magnetic recording medium as claimed in claim 1, wherein said magnetic recording layer has a squareness ratio of not less than 0.91.

3. The magnetic recording medium as claimed in claim 1, wherein said nonmagnetic support is made of a polyethylene terephthalate film and said recording medium has a heat shrinkage ratio of not higher than 0.5% after being allowed to stand at 110° C. for 4 hours.

4. The magnetic recording medium as claimed in claim 1, wherein said magnetic recording layer has a thickness in the range of 0.5 to 10 μm.

5. The magnetic recording medium as claimed in claim 1, wherein said nonmagnetic support has a thickness in the range of 5 to 30 μm.

6. The magnetic recording medium as claimed in claim 1, wherein the ratio of the thickness of the nonmagnetic support and that of the magnetic recording layer is in the range of 10:5 to 10:9.

7. The magnetic recording medium as claimed in claim 1, wherein said nonmagnetic support has the heat shrinkage ratio of not higher than 1.5%.

* * * * *